US012761627B2

(12) United States Patent
Deichmann et al.

(10) Patent No.: US 12,761,627 B2
(45) Date of Patent: Oct. 13, 2026

(54) METHOD AND DEVICE FOR MONITORING A MILLING MACHINE

(71) Applicant: SIEMENS AKTIENGESELLSCHAFT, Munich (DE)

(72) Inventors: Jonas Deichmann, Cologne (DE); Marcel Rothering, Nuremberg (DE); Aldo Sedeno, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 872 days.

(21) Appl. No.: 18/023,954

(22) PCT Filed: Aug. 31, 2020

(86) PCT No.: PCT/EP2020/074228

§ 371 (c)(1),
(2) Date: Feb. 28, 2023

(87) PCT Pub. No.: WO2022/042866

PCT Pub. Date: Mar. 3, 2022

(65) Prior Publication Data

US 2023/0315044 A1 Oct. 5, 2023

(51) Int. Cl.
*G05B 19/4065* (2006.01)
*G05B 13/02* (2006.01)

(52) U.S. Cl.
CPC ..... *G05B 19/4065* (2013.01); *G05B 13/0265* (2013.01); *G05B 2219/37355* (2013.01)

(58) Field of Classification Search
CPC ............ G05B 19/4065; G05B 13/0265; G05B 2219/37355; G05B 13/027; G05B 2219/33034
See application file for complete search history.

(56) References Cited

U.S. PATENT DOCUMENTS 4,442,494 A 4/1984 Fromson et al.
8,781,982 B1 7/2014 Das et al.
(Continued)

FOREIGN PATENT DOCUMENTS

CN 105974886 A 9/2016
CN 109947072 A 6/2019
(Continued)

OTHER PUBLICATIONS

Liu Mingyang :"130 Two-motor gapping study", Jul. 6, 2017, pp. 1-2.

(Continued)

*Primary Examiner* — Tung S Lau
(74) *Attorney, Agent, or Firm* — Lempia Summerfield Katz LLC

(57) ABSTRACT

A method of monitoring a milling machine includes deploying an untrained machine learning model for determining one or more anomalies in time series data. During operation of the milling machine, first time series data representing a rotational speed of a milling head of the milling machine and at least one further operating parameter of the milling machine are obtained by the untrained machine learning model. The untrained machine learning model is trained, during operation of the milling machine, based on the obtained first time series data. Second time series data representing the rotational speed of the milling head of the milling machine and the further operating parameter are obtained by the trained machine learning model during operation of the milling machine. One or more anomalies in the second time series data are determined by the trained machine learning model during operation of the milling machine.

20 Claims, 11 Drawing Sheets

(56) References Cited

U.S. PATENT DOCUMENTS

| | | | | |
|---|---|---|---|---|
| 2003/0163286 | A1 | 8/2003 | Yasugi | |
| 2004/0179915 | A1 | 9/2004 | Hill et al. | |
| 2007/0088550 | A1 | 4/2007 | Filev et al. | |
| 2016/0091393 | A1 | 3/2016 | Liao et al. | |
| 2017/0115655 | A1 | 4/2017 | Chiu | |
| 2019/0152011 | A1 * | 5/2019 | Kummari | G06N 5/04 |
| 2019/0180152 | A1 | 6/2019 | Krompaß | |
| 2019/0324413 | A1 | 10/2019 | Ferroni | |
| 2022/0163947 | A1 * | 5/2022 | Michan | G05B 23/0281 |

FOREIGN PATENT DOCUMENTS

| | | | | |
|---|---|---|---|---|
| CN | 111069975 | A | 4/2020 | |
| CN | 107678398 | B | 7/2020 | |
| CN | 113678076 | A * | 11/2021 | G06N 3/0442 |
| DE | 102017129584 | A1 | 6/2019 | |
| EP | 3608501 | A1 | 2/2020 | |
| EP | 3715989 | A1 | 9/2020 | |
| JP | 3446518 | B2 | 9/1998 | |
| JP | 2003326438 | A | 11/2003 | |
| WO | 2020200903 | A1 | 10/2020 | |

OTHER PUBLICATIONS

Ahmad, Subutai, and Scott Purdy. "Real-time anomaly detection for streaming analytics." arXiv preprint a href="arXiv:1607.02480" target="_blank"arXiv:1607.02480/a (2016).

Hill, David J., and Barbara S. Minsker. "Anomaly detection in streaming environmental sensor data: A data-driven modeling approach." Environmental Modelling Software 25.9 (2010): 1014-1022.

PCT International Search Report and Written Opinion of International Searching Authority mailed May 25, 2021 corresponding to PCT International Application No. PCT/EP2020/074228.

* cited by examiner

METHOD AND DEVICE FOR MONITORING A MILLING MACHINE

This application is the National Stage of International Application No. PCT/EP2020/074228, filed Aug. 31, 2020. The entire contents of this document are hereby incorporated herein by reference.

TECHNICAL FIELD

The present embodiments relate to monitoring a milling machine and, more specifically, monitoring a milling machine using machine learning.

BACKGROUND

Patent application US 2016/091393 A1 describes a method or system for forecasting and planning in production facilities. In order to detect tool wear, the performance of the spindle is monitored, among other things. In order to compensate for tool wear, the performance of the spindle and thus its speed of rotation are increased. The long-term trend of the spindle's performance is extrapolated in order to predict the remaining useful life.

The patent application US 2007/088550 A1 describes a method for predictive maintenance of a machine. For this purpose, data relating to the operation of the machine, such as vibration, speed, or current, are recorded. Features are generated from this data in order to make an error prediction.

The patent application US 2004/179915 A1 describes a machine tool. For the analysis of the behavior of the machine tool, signals referred to as signature variables are recorded there and used as input variables for an artificial neural network.

The U.S. Pat. No. 8,781,982 B1 describes a method and a device for determining the remaining useful life. For this purpose, operating data is fed into an artificial neural network. The operating data may be vibration data, acoustic data, and acceleration data.

Further, European patent application EP19166079 and international patent application PCT/EP2020/058069 disclose methods and devices for monitoring a milling process using artificial intelligence.

SUMMARY AND DESCRIPTION

Milling is generally a cutting manufacturing process for the production of workpieces with a geometrically defined shape. During milling, material is removed by rotating the milling tool or milling head at high speed around its own axis, while either the milling tool itself follows the contour to be produced on the workpiece or the workpiece is moved accordingly relative to the milling head. Milling machines may be used for milling different workpieces (e.g., also for milling printed circuit boards). For example, dividing lines may be produced between conductor track surfaces of a circuit board by milling. A large amount of dust may arise during the milling process, so that the milling spindle may get stuck after a certain operating time. In conventional milling machines, such errors or failures are only detected after the respective error (e.g., the blocking of the milling spindle) has occurred. A failure of a milling machine during a milling process may lead to a significant delay in the manufacturing process of the object to be manufactured. In addition, the workpiece that is not finished in this manufacturing step is in many cases a reject product and cannot be processed further or may need to be tested for proper functioning. A standstill of a milling machine during an ongoing manufacturing process requires the immediate use of maintenance personnel or service technicians to carry out maintenance or repair measures. In many cases, such service technicians are not immediately available and have to be requested. This may lead to a temporary standstill of an entire production line within a factory.

In addition, the milling machine may be operated in different modes, for example, depending on the specific application of the respective milling machine. For example, in a production line, a plurality of milling machines may be operated, where the operation of each milling machine is subject to individual conditions (e.g., dependent on the wear of the respective milling heads).

The present embodiments may obviate one or more of the drawbacks or limitations in the related art. For example, a method and a device for monitoring a milling process that predicts possible failures due to an affected milling machine at an early stage (e.g., before a breakdown of the milling process) so that countermeasures may be taken in good time are provided. By an early identification of a breakdown, the time a milling machine is stopped may be reduced to a minimum. As another example, monitoring of a milling machine independent of the type of the milling machine and independent of the specific application (e.g., workpiece production) the milling machine is used in is provided.

According to a first aspect, a method of monitoring a milling machine is provided. The method includes deploying an untrained machine learning model for determining one or more anomalies in time series data. The method further includes obtaining, by the untrained machine learning model (e.g., from a converter powering the milling machine), during operation of the milling machine, first time series data representing a rotational speed of a milling head of the milling machine and at least one further operating parameter of the milling machine. The at least one further operating parameter may correspond to the supply current or is dependent on the supply current of the milling machine. The method also includes training the machine learning model, during operation of the milling machine, based on the obtained first time series data. The method also includes obtaining, by the trained machine learning model, during operation of the milling machine, second time series data representing the rotational speed of the milling head of the milling machine and the further operating parameter. The method also includes determining, by the trained machine learning model, during operation of the milling machine, one or more anomalies in the second time-series data.

According to a second aspect, a computer program product is provided. The computer program product includes program code that, when executed, performs the acts of the first aspect.

According to a third aspect, an apparatus (e.g., a milling machine, an edge device, and/or a cloud platform) may include a processor and a memory. The apparatus is operative to perform the acts of the first aspect.

DETAILED DESCRIPTION

Figure 1:
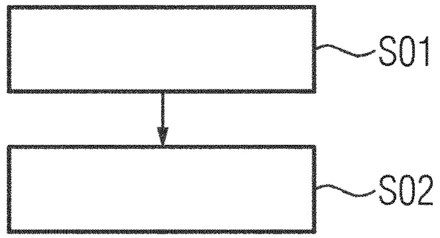
FIG. 1 is a flowchart that illustrates a possible embodiment of monitoring a milling process.

As shown in the flow chart according to FIG. 1, a method for monitoring a milling machine may include multiple acts in the illustrated embodiment.

In a first act S01, a rotational speed or speed of rotation of a milling head 2 of a milling machine 1 is recorded. Further, in act S01, at least one further operating parameter of the milling machine 1 is recorded during the milling process. This further operating parameter has, for example, an electrical supply current for operating the milling machine 1. This electrical supply current is used, for example, to supply an electric motor 3 that drives the milling head 2 of the milling machine 1.

In a further act S02, the detected rotational speed R and the detected operating parameters (e.g., the electrical supply current I) are evaluated by a trained machine learning model for recognizing anomalies A during the milling process.

In a further possible act (not shown in FIG. 1), after anomalies have been detected, a message is generated for the operator of the milling machine 1. For example, anomalies recognized may be displayed in real time on a display unit of the milling machine 1. Further, in a further act, maintenance measures for eliminating possible causes of the anomalies A recognized may be automatically initiated. After the detection of anomalies during the milling process in act S2, a failure probability or a probable failure period of the relevant milling machine 1 is calculated in one possible embodiment. Possible maintenance measures may be tailored to the calculated failure probability and/or the expected failure period. For example, milling machines 1 with a high probability of failure are serviced or repaired with a high degree of urgency or priority. Further, based on the calculated anticipated downtime periods, it may be controlled which maintenance measures are carried out on which milling machines 1 in which period. In a further possible embodiment, after anomalies have been identified during the milling process, at least one possible cause for the occurrence of the anomalies A is determined (e.g., wear or blocking of a drive spindle).

In one possible embodiment, the machine learning model used to determine anomalies may include a One-Step-Ahead Predictor, such as ARIMA, a Spatial Detector, such as an SVM, or a Naïve threshold. Other machine learning models such as an artificial neural network may be used. The machine learning model may be trained in a training phase after the start of a milling process. This makes it possible to uninterruptedly operate the production and, at the same time, upgrade the monitoring of the milling machine or milling process. Training data with regard to the rotational speed R and the at least one further operating parameter P of the milling machine 1 is obtained during operation of the milling machine.

The machine learning model that is used to recognize the anomalies may, in one possible embodiment, be downloaded as an application (app) from a database via a network into a computing unit of the milling machine 1 and trained in a training phase during the milling process (e.g., during operation of the milling machine). In one possible embodiment, the workpiece W to be milled by the milling machine 1 has a printed circuit board.

The detection of the rotational speed R and the further operating parameter (e.g., the supply current I) in act S01 is carried out in a possible embodiment based on corresponding data, which, at a data rate of about 1/sec (e.g., 1 Hertz), is fed to the machine learning model. The determination or recognition of the anomalies in act S02 by the trained machine learning model may take place in real time during the milling process (e.g., during the production process).

For example, the detection of one or more current peaks (e.g., short-term current peaks) in the supply current (e.g., from approximately 5 to 10 seconds) is recognized as an anomaly. There is a sudden increase in the supply current with a subsequent, slow decrease of the falling edge. Such an anomaly is caused, for example, by milling splinters that get into the milling spindle. There, the milling splinters cause increased friction. By readjusting the supply voltage, the supply current is increased (e.g., sudden increase) in order to maintain a constant speed or rotational speed of the milling head. If the milling splinters are crushed by the rotary movement of the milling spindle, the supply current normalizes again (e.g., falling edge). This may be done in order to keep the rotation speed of the milling head or milling spindle constant. In order to detect an anomaly, the sampling rate of the supply current may also be suitably selected so that a current peak or anomaly is not missed by undersampling the supply current. Further, the sampling rate of the supply current may be selected to be sufficiently low at the same time, so that no excessive amounts of data arise.

A quality indicator that indicates whether the detected measuring points of the supply current are no longer in the normal range of the milling machine may be formed. The higher this value, for example, the more likely the measuring points are outside the normal range. The quality indicator may be formed as a function of rotation speed and supply current. Based on the number of anomalies that have occurred, a remaining service life or failure of the milling machine may then be determined or predicted.

According to one embodiment, a milling process in which milling splinters are produced (e.g., by milling a printed circuit board) is monitored (e.g., in order to determine or predict a failure or a remaining useful life of the milling machine).

In a further embodiment, the supply current is monitored to determine whether there is a brief or transient deviation from a base value of the supply current and whether the supply current returns to this base value. This monitoring may be done by a trained, adaptive algorithm. Additionally or alternatively, it is possible to provide a threshold value by which such a current peak of the supply current is recognized. Once such a current peak in the supply current has been detected, it can be monitored whether the supply current falls again below the threshold value (e.g., to the base value of the supply current). The base value may be the value of the supply current from which the current peak develops. The base value of the supply current may be specified by the desired rotational speed of the milling machine (e.g., the spindle of the milling machine), or the rotational speed of the milling machine is specified by the basic value of the supply current. In addition, the frequency of such current peaks may be recorded and, depending on this, a failure of the milling machine or a remaining service life may be determined; this may be done, for example, using a quality indicator.

Sufficient sampling of the supply current is to be provided such that the current peaks are recognized. For example, the supply current may be sampled such that the current peaks caused by milling splinters that have entered the milling spindle may be detected. For example, the supply current may be sampled approximately once per second or more often than once per second.

In a further embodiment, it is monitored whether there is a change (e.g., a current peak) in the supply current at constant rotation speed (e.g., essentially constant rotation speed). This change in the supply current is caused, for example, by the grinding of milling chips. The supply current may therefore be monitored for current peaks resulting from the grinding of milling splinters (e.g., with a constant rotation speed of the milling head or the milling spindle). These current peaks may have a typical profile. This typical characteristic of a current peak described above may be monitored and/or detected, for example, by a trained machine learning model. For this purpose, the machine learning model is trained during operation of the milling machine since each milling machine may either be operated in different operation modes, may be parameterized to perform a specific task, etc. A current peak may then be recognized as an anomaly by the trained machine learning model. For example, the trained, machine learning model may distinguish current peaks caused by the grinding of milling splinters from current peaks of other origin.

In addition, the machined workpiece may be a workpiece made of a homogeneous material, or a section of the workpiece that is machined by the milling machine. The section consists of a homogeneous material. This provides that a constant rotation speed of the milling head may be assumed. Otherwise, there would be changes in the case of inhomogeneities in the workpiece in the rotation speed, or the rotation speed would have to be adapted depending on the section of the workpiece being machined. Provision may thus be made for a number of sections to be machined with different predetermined target rotational speeds (e.g., speed setpoints). The respective target rotation speed may serve as a base value for detecting current peaks.

Instead of the supply current or together with the supply current, the supply voltage may also be recorded and evaluated. Instead, other variables derived from the supply current and/or supply voltage may also be used for monitoring the milling process or for predicting a remaining useful life or failure probability of the milling machine.

Printed circuit boards consist of electrically insulating material with conductive connections (e.g., conductor tracks) adhering to the electrically insulating material. Fiber-reinforced plastic, or hard paper for cheaper devices, is the usual insulating material. The conductor tracks mostly consist of a thin layer of copper.

Printed circuit boards may also be structured by milling the copper layers (e.g., "isolation milling", see picture below for soldering grid boards). Such circuit boards do not consist of conductor tracks, but of surfaces that are separated from each other by milling tracks.

In the milling technique, a milling machine (e.g., a pin milling cutter) creates dividing lines between the conductor surfaces. All copper remains in place (e.g., island process). The wet chemical and photolithographic steps are omitted. CNC programs may be generated with special CAD software so that circuit boards may be manufactured quickly.

Figure 2:
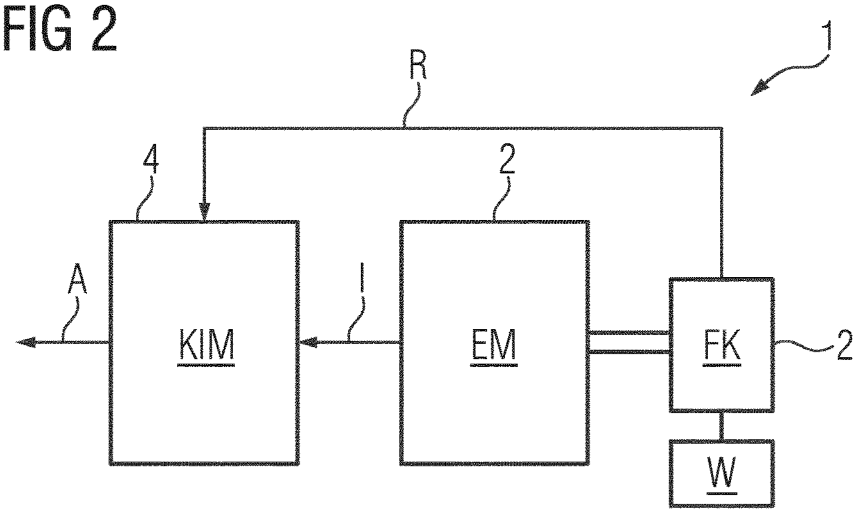
FIG. 2 is a block diagram that illustrates an exemplary embodiment of a milling machine.

FIG. 2 shows a block diagram to illustrate an embodiment of a milling machine 1. The milling machine 1 shown in FIG. 2 is used for milling a workpiece W. The workpiece W is, for example, a printed circuit board. The milling machine 1 has at least one rotatable milling head 2 for machining the workpiece W in a milling process. The milling head 2 is driven by an electric motor 3 of the milling machine 1. The electric motor 3 draws an electrical supply current. The supply current may include one or more current phases (e.g., L1, L2, L3). The milling machine 1 according to the present embodiments may be operatively coupled to a machine learning module 4, as shown in FIG. 2. The machine learning module 4 detects, during the milling process, based on a detected rotational speed R of the milling head 2 and at least one other operating parameter I of the milling machine 1, anomalies that occur during the milling process. The machine learning module 4 may evaluate a number of operating parameters I for the detection of anomalies A. In one possible embodiment, the machine learning module 4 executes a trained machine learning model during the milling process.

The machine learning model of the machine learning module 4 is trained during the ongoing milling process. This training data may include, for example, power supply data and rotation speed data of the milling head 2. This training data may be located in a data memory. In one possible embodiment, the training data is loaded from a database of the operator of the milling machine and used for training purposes.

The machine learning model no longer needs to be selected as a function of a type of milling machine 1 and/or a type of workpiece W to be milled in the milling process. In one possible embodiment, the machine learning model may also be downloaded from a database into the machine learning module 4 of the milling machine 1. For example, the machine learning model may be downloaded via a data network from a cloud platform 6 of a milling machine manufacturer or a milling machine operator. Alternatively, the machine learning model may be deployed in the cloud platform.

In an embodiment, the milling process itself may be controlled by a CNC program that is executed by a controller or microprocessor of the milling machine 1 according to the present embodiments. During the milling process, a feed movement of the milling head 2 takes place perpendicular or obliquely to the axis of rotation of the milling head 2. If the workpiece W is a printed circuit board, the milling machine 1 is controlled by software or a CNC program to generate paths that follow around desired conductor path. For example, the conductor track to be produced is insulated from a remaining conductive material (e.g., copper). This is also known as isolation milling. A small, conical milling head may be used to mill insulation channels, which removes conductive material (e.g., copper) along the calculated movement paths. The removed material may block or impair the ability of the milling head 2 to move. Such abnormalities or anomalies are recognized or detected early with the aid of the method according to the present embodiments. In one possible embodiment, corresponding evaluation numbers may also be calculated for various anomalies A that indicate the extent of the recognized anomaly or the failure probability resulting therefrom. In one possible embodiment, such anomaly key figures may be output to the operator of the milling machine 1 in real time via a display unit. With the method according to the present embodiments, possible anomalies may be recognized around the clock during the ongoing milling process, and possible causes of errors may be determined. As a result, repair and maintenance measures may be initiated or carried out on the relevant milling machine 1 in good time, so that downtimes within the milling process are largely avoided. The method according to the present embodiments may be used for a large number of milling machines that are used simultaneously in a production line.

In the embodiment shown in FIG. 2, the machine learning module 4 is implemented locally in a computing unit of the milling machine 1. In an alternative embodiment, the machine learning module 4 may also be implemented on a remote server of a cloud platform 6, which communicates unidirectionally or bidirectionally with a control of the milling machine 1 via a data connection. In one possible embodiment, the technical data connection includes a local network or intranet. Alternatively, the data connection may also be a global network or the Internet. The method according to the present embodiments for monitoring the milling process is a computer-implemented method that, in one possible embodiment, is stored on a computer-readable medium (e.g., a non-transitory computer-readable storage medium). The computer-readable medium includes, for example, a data memory of the milling machine 1. Further, the computer-readable medium may also have a portable data carrier (e.g., a CD-ROM or a USB stick). Depending on the application, different adaptive algorithms may be used in one possible embodiment for the detection of anomalies during the milling process. For example, a support vector machine may be provided for calculating a quality indicator. In one possible embodiment, further sensors are provided in the vicinity of the milling head 2, which provide additional data to the artificial intelligence module 4. For example, image sensors may supply image data to the artificial intelligence module 4 as input operating parameters I of the state vector z. As a result, the reliability or accuracy of the method according to the present embodiments may be increased further.

Figure 3:
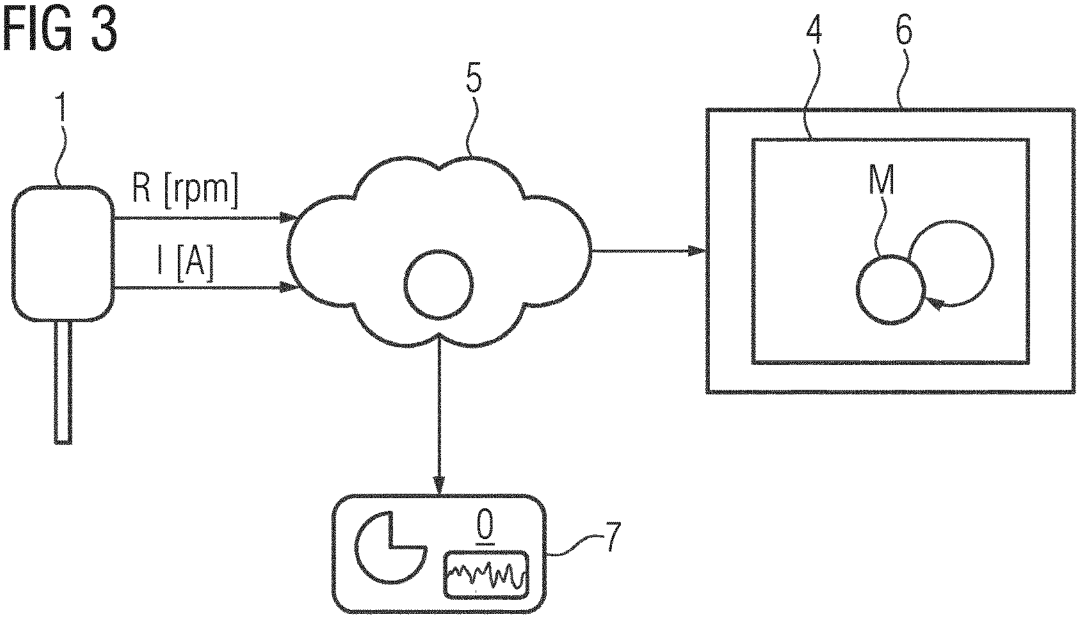
FIG. 3 is a block diagram that illustrates a further possible embodiment of the milling machine.

FIG. 3 shows schematically a further exemplary embodiment for monitoring a milling machine during operation (e.g., a milling process). In the exemplary embodiment shown, the milling machine 1 supplies operating parameters recorded via an interface via a data network or a cloud 5 to a cloud platform 6 in which an artificial intelligence module 4 is integrated. Anomalies or information may be output to the operator of the milling machine 1 in real time via a display device 7. In one possible embodiment, the display device 7 is also connected to the data network or the cloud 5. In one possible embodiment, the display device 7 is a portable device (e.g., a smartphone belonging to the user). With the method according to the present embodiments, deviations in the characteristic space of the operating parameters are detected at an early stage. With the aid of a machine learning model M, causes for the occurrence of anomalies or failures of the milling machine 1 may also be determined automatically. In the exemplary embodiment shown in FIG. 3, two features or operating parameters (e.g., the electrical supply current I and the rotational speed R) are used to train the machine learning model. In one possible embodiment, the trained machine learning model requires a relatively small storage space of less than 10 MB. This makes it possible to implement the adaptive algorithm from a cloud platform 6 on an automation device. The method according to the present embodiments may be scaled in a simple manner for a large number of milling machines 1. In one possible embodiment, the machine learning module 4 supplies evaluation numbers for the anomalies recognized or possible failure probabilities. In a possible embodiment of the method, the operating parameters P are evaluated using a trained, adaptive algorithm on a server of the cloud platform 6 based on operating data that is sent from one or more milling machines via the network 5 to the server of the cloud platform 6. In one possible embodiment, the adaptive algorithm may be downloaded from a database as an application and executed by the artificial intelligence module 4 after the training has taken place. In one possible embodiment, the machine learning module 4 may be provided locally in the milling machine 1, as shown in FIG. 2, or implemented remotely on a server of a cloud platform 6, as shown in FIG. 3.

Figure 4:
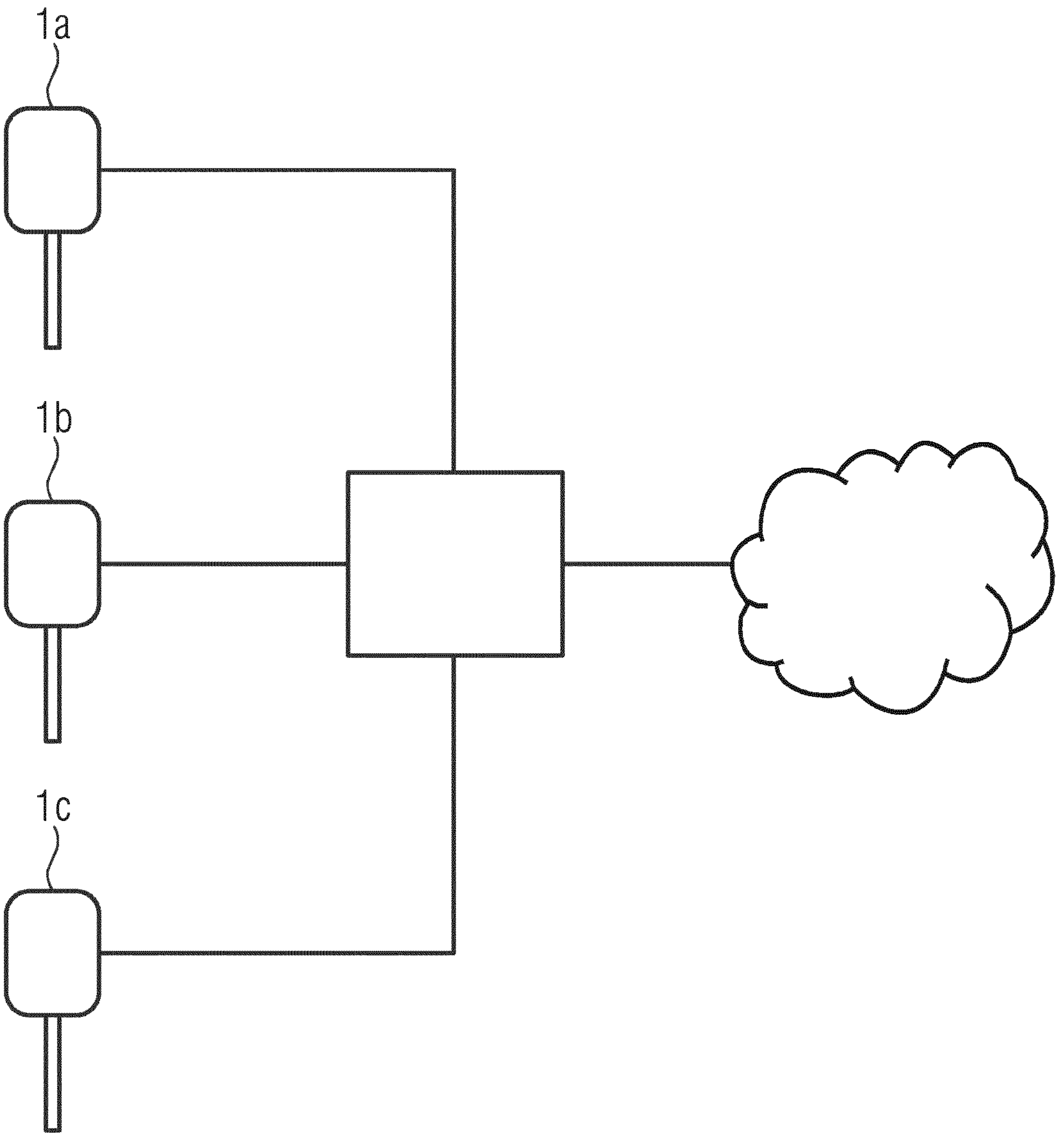
FIG. 4 shows a plurality of milling machines each of which may be monitored in accordance with an embodiment.

Turning to FIG. 4, a production line including multiple milling machines 1*a*, 1*b*, 1*c* is shown. The milling machines 1*a*, 1*b*, 1*c* may be coupled to a gateway or other kind of device providing connectivity to a cloud platform. A machine learning model may be associated with each of the milling machines 1*a*, 1*b*, 1*c*. As each milling machine is used at a different station in the production line, the tasks and operating modes as well as the workpieces being produced by the milling machines may differ. In addition, the operator of the production may have milling machines of different vendors installed in the production line. Hence, the milling machines may differ with respect to the characteristic operating setpoints (e.g., regarding rotational speed and current).

Figure 5:
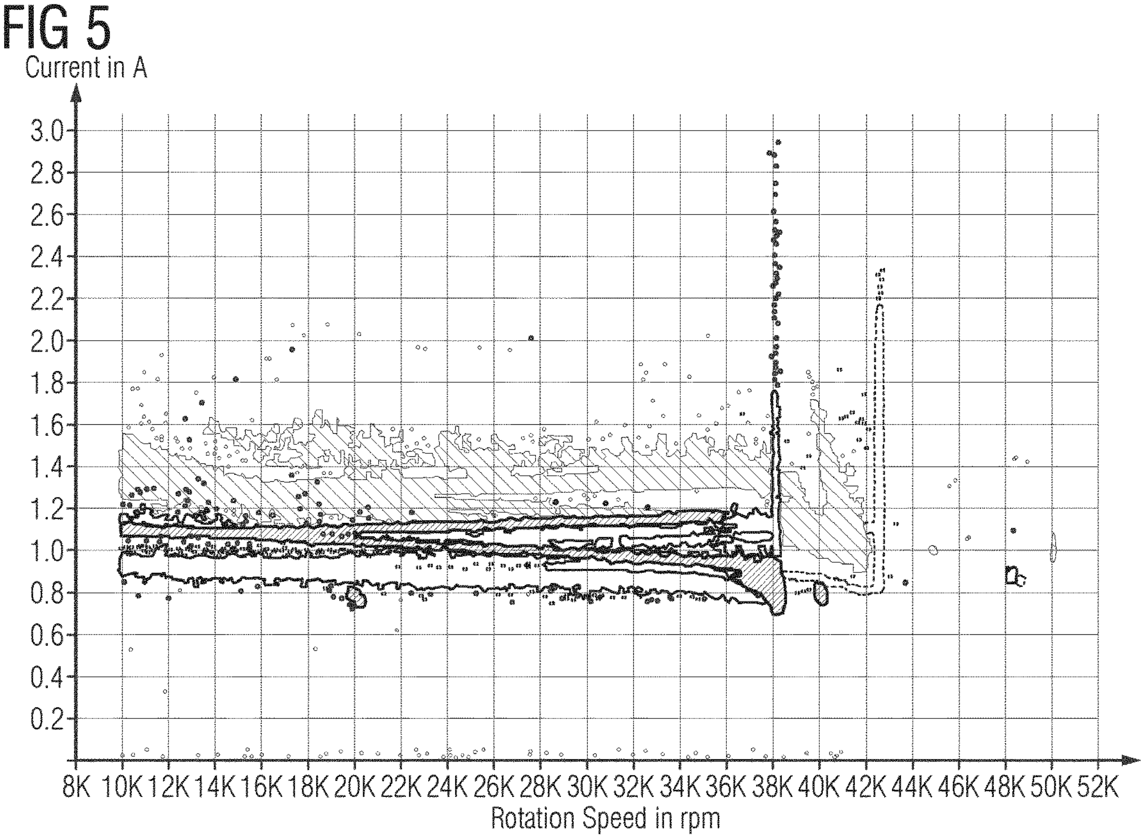
FIG. 5 shows operational patterns of different milling spindles, where a rotational speed (x-axis) and an electrical current are illustrated.

The different operational spaces of different milling machines are shown in FIG. 5. FIG. 5 shows the scatter plot of the rotational speed (x-axis) and the electrical current (y-axis) for different types of milling spindles and/or milling machines (e.g., color highlighting). The red, orange, and yellow scatter plots show anomalies, whereas the blue scatter plot is free of anomalies. The anomaly is reflected in the large values for the electrical current. This is due to the fact that the motor tries to keep the milling frequency constant during operation. However, if milling dust makes the spindle stuck, the current is to be increased in order to keep the frequency or rotational speed constant. An anomaly of one spindle is not necessarily similar or on a same scale as an anomaly of other spindles. Different spindles work on different scales of rotational speed and current. For this reason, a model is trained or fine-tuned after deployment of the machine learning model in order to learn the scales, at which the spindle operates, automatically.

Figure 6:
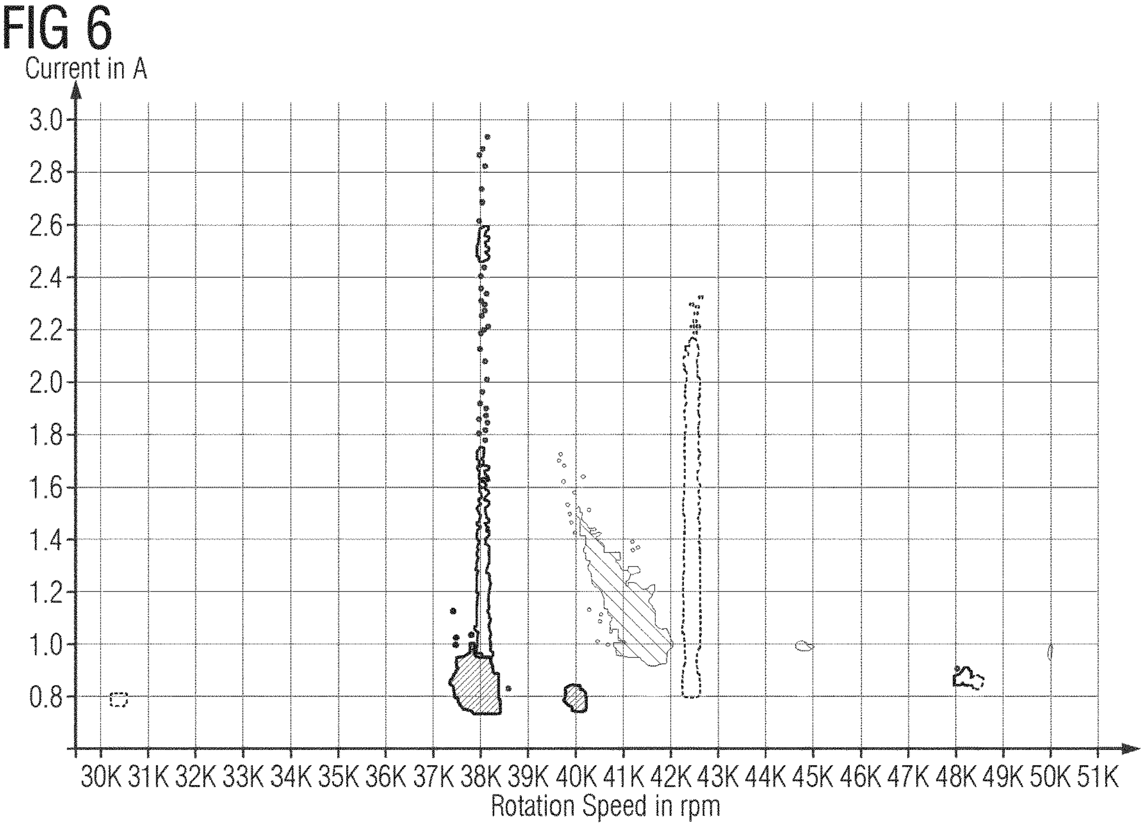
FIG. 6 shows operational patterns of different milling spindles, after the removal of a ramp-up phase and a ramp-down phase.

Now turning to FIG. 6, before fine-tuning, the data is pre-processed in order to remove ramp-up and ramp-down phases of the spindle. These phases occur when a milling spindle starts (e.g., ramp-up) or stops (e.g., ramp-down). After the removal, the current and speed may be rather constant during the milling process, since the spindle operates with constant current and speed. The remaining, preprocessed data is shown in the scatter plot of FIG. 6. The different operating modes of the spindle may thus be identified. For example, the spindle corresponding to the blue scatter plot has two different operation modes: one at 36 k rpm and the other one at 40 k rpm.

Subsequently, the preprocessed data is fed into the machine learning model. This model may be operated in at least two phases: a calibration phase and a prediction phase.

During the calibration phase, the machine learning model may be trained. The machine learning model may be One-Step-Ahead Predictor, a Spatial Detector, or Naïve Threshold.

Figure 7:
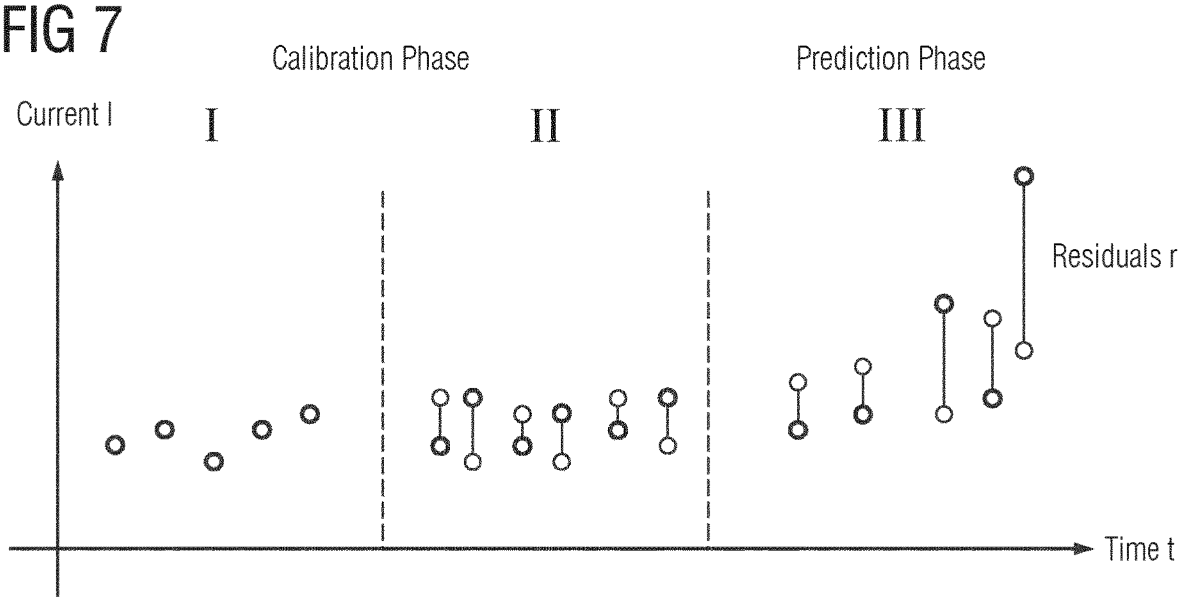
FIG. 7 shows first time series data and second time series data of the milling machine.

FIG. 7 shows the two different phases. During the calibration phase, first time series data is obtained, and the model (e.g., an autoregressive integrated moving average model (ARIMA) of category) is trained on the data of interval I. This model is then used in Interval II to compare predictions (green dots) (e.g., made by a One-Step-Ahead predictor) to the observed data (white dots). This leads to a distribution over the residuals (e.g., differences between observation and prediction) and defines the domain for the residuals of normal operation. There is no need for a very precise fit or machine learning model for the data in interval I. The only requirement is that the machine learning model is able to make better predictions for normal data than for anomalous data.

In the interval III (e.g., prediction phase), the residuals are computed and compared to the distribution of interval II. If the distance to the median or mean of the distribution is too large (e.g., in terms of inter quartile ranges or standard deviations), the corresponding data point may be identified as an anomaly.

Further details of the machine learning model (e.g., the One-step-Ahead Predictor) may be found in Environmental Modelling & Software 25 (2010) 1014-1022/D. J. Hill, B. S. Minsker "Anomaly detection in streaming environmental sensor data: A data-driven modeling approach."

The same approach (e.g., two-phase approach) may be employed for a machine learning model in the form of a spatial detector, where, for example, a one class support vector machine is trained on the time series data of interval I, including time series data of current I and rotational speed S. An anomaly score may be computed based on a distribution of times series data during the interval II (e.g., by calculating the distances to the hyperplane of the support vector). Afterwards, the anomaly score computed during the prediction phase (e.g., interval III) may be compared with the distribution.

Alternatively, a Naïve Threshold model may be employed. In that case, a threshold may be computed using the data of the two time series data of an interval (e.g., the time series data of intervals I and II). Subsequently, new time series data (e.g., of interval III) may be compared to that threshold.

Depending on the specific underlying model (e.g., as described in the above), the intervals I, II, and III may also move forward in time, leading to a type of continuous learning. However, the model and the time series data may need to fulfill one or more of the following requirements: 1. No overfitting by using small data sets (e.g., in order to make the duration of the calibration phase short; around 24 hours); 2. Fast predictions (e.g., low latency); 3. Computationally cheap (e.g., do not require a huge amount of memory and cpu; may easily run on an edge device); and 4. Interval I and II should not contain any or only a few anomalies.

Further, the prediction phase (e.g., Interval III) may be divided in multiple windows (e.g., in one or more large windows L and a plurality of small windows S). Then, the distribution of the scores of the small windows may be compared to the large windows. This leads to a model that automatically updates the distribution (e.g., of Interval II), but does not need to be retrained. In other words, the interval I is not needed again but nonetheless allows finding local anomalies (e.g., in the small window S) by comparing the anomaly score to a larger context (e.g., window L).

Further, an aggregation of the of used models is provided. A majority vote may be provided. Therein, if most detectors (e.g., the majority) identify/label a data point as an anomaly, the data point is altogether identified as an anomaly.

A hysteresis may be implemented (e.g., that an alert is sent to the customer (only) if a certain number of anomalies occurred in a defined time frame) in order to reduce the number of false alarms.

In general, the untrained machine learning model may be packaged as Apps in an App store (e.g., on a cloud platform as described in the above) that customers may download and apply to their respective machines (e.g., milling machines). During the calibration phase that may start automatically (e.g., after the download), the parameters for the anomaly detection model are learned. Further, the methods provided may be implemented at the customer's machine as a service delivery. Further, a cloud platform solution, such as MindSphere, may be offered for a fleet of milling machines with further service and maintenance offerings.

Figure 8:
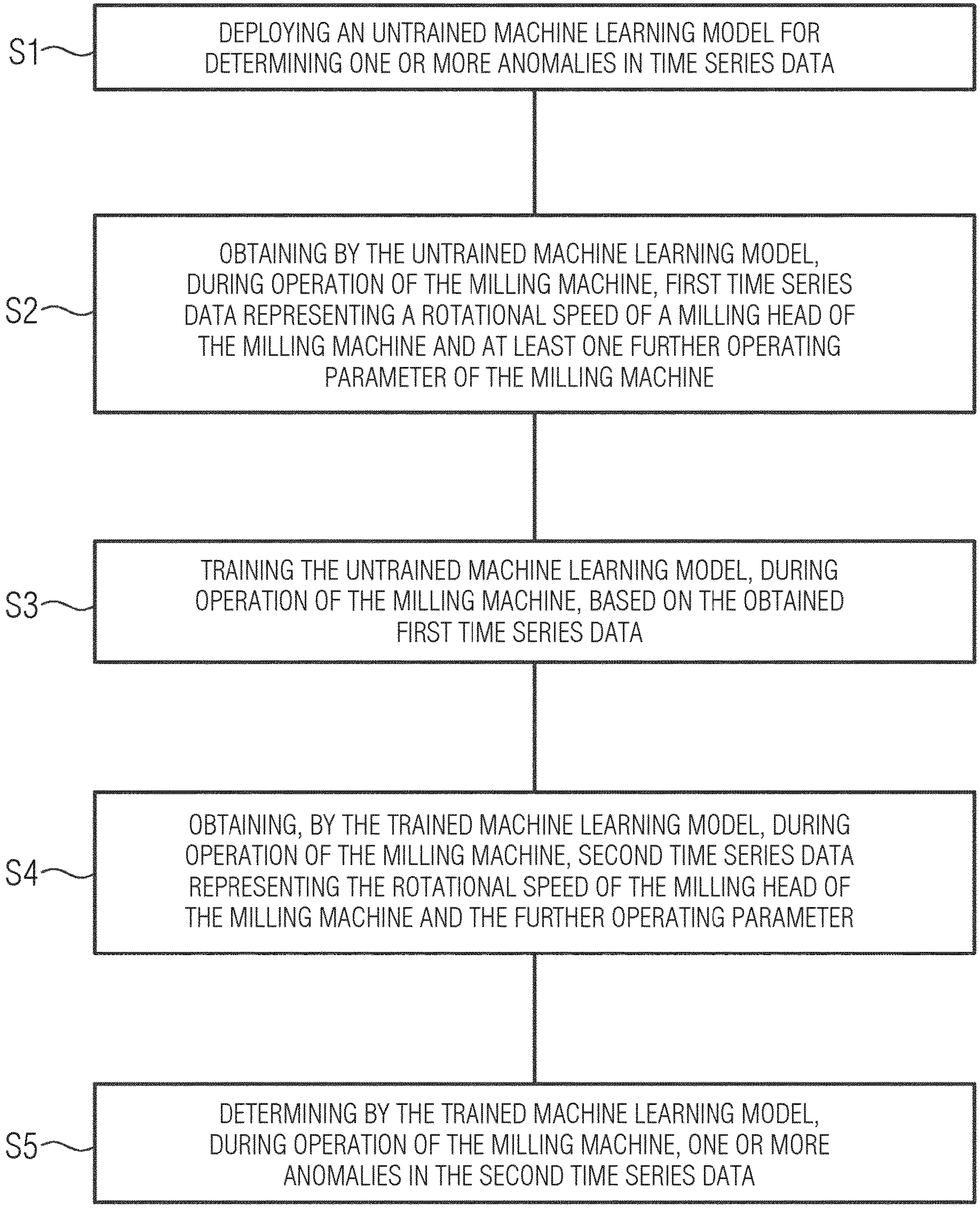
FIG. 8 shows an example of methods acts of an embodiment.

Turning to FIG. 8, further exemplary method acts are shown. In a first act S1, an untrained machine learning model may be deployed for determining one or more anomalies in time series data. Herein, untrained may be uninitialized. Untrained may also refer to a machine learning model having variables/parameters that are initialized at the time of deployment (e.g., by assigning random values to the variables/parameters) but are later overwritten during training or by training the machine learning model.

For example, the program code (e.g., Python) in which the machine learning model is written may include variables or parameter to be trained. The variables or parameters are not initialized in the untrained machine learning model. In that case, the variables/parameters are still unknown and are set "on the fly" during training (e.g., during calibration phase; including intervals I and II of FIG. 7). The machine learning model may be used to observe the spindle of the milling machine during the training (e.g., during the first hours of operation of the milling machine) and derives the variable/parameters from this. Only then, the machine learning model may be used for "predicting" or calculating the anomaly score.

The simpler the machine learning model, the lower the hours or data amount of the first time series data needed. To that end, the first time series data may include different operating states (e.g., all operating states of a milling machine) in order to learn the (nominal) behavior of the milling machine. This is because operating states may vary from milling machine to milling machine (e.g., from spindle to spindle). The first time series data optimally covers a time period of two weeks.

Thus, in a second act S2, during operation of the milling machine, first time series data representing a rotational speed of a milling head of the milling machine and at least one further operating parameter of the milling machine may be obtained by the untrained machine learning model. As mentioned, the supply current is controlled for the milling machine or the milling process to operate with constant rotational speed, and hence, the supply current is increased if the spindle becomes stuck (e.g., in case of one or more splinters).

As mentioned, the first time series data may be obtained during the first or initial operating hours of the milling machine, assuming that during that time the operation of the machine is nominal.

In a third act S3, the untrained machine learning model is trained during operation of the milling machine based on the obtained first time series data. This allows, for example, to enhance existing milling machine and production line installations by the monitoring method proposed without interrupting operation.

In a fourth act S4, the trained machine learning model obtains, during operation of the milling machine, second time series data representing the rotational speed of the milling head of the milling machine and the further operating parameter, such as the supply current.

The first time series data and/or the second time series data may be obtained from a CPU, PLC, and/or Controller of the milling machine, a converter powering the milling machine, and/or from sensor elements attached to the milling machine.

In a fifth act S5, the trained machine learning model determines, during operation of the milling machine, one or more anomalies in the second time series data.

Figure 9:
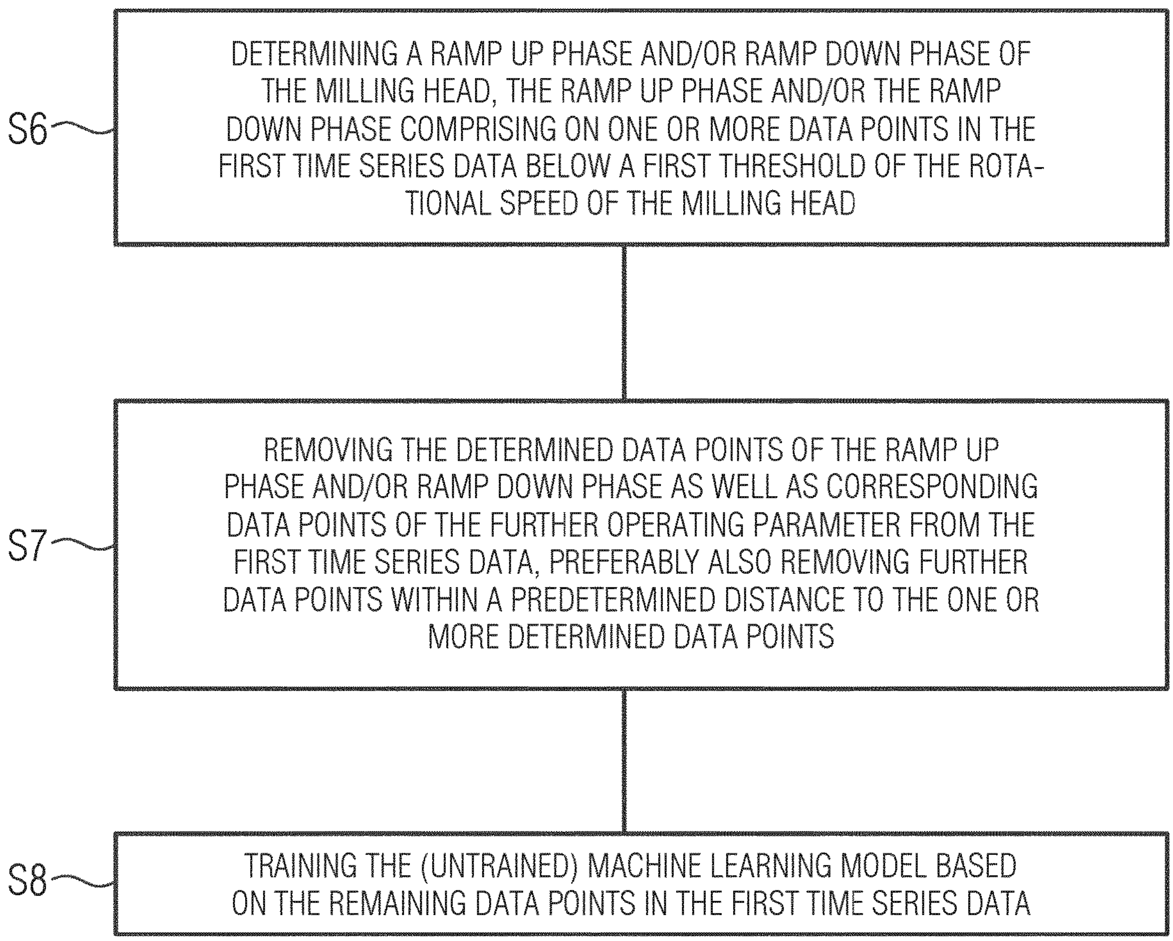
FIG. 9 shows an example of methods acts of another embodiment.

Turning to FIG. 9, further acts of an exemplary method are shown.

In act S6, a ramp up phase and/or ramp down phase of the milling head is determined. The ramp up phase and/or the ramp down phase includes one or more data points in the first time series data below a first threshold of the rotational speed of the milling head.

In act S7, the determined data points of the ramp up phase and/or ramp down phase are removed from the first time series data. In addition, corresponding data points of the further operating parameter may be removed from the first time series data (e.g., also removing further data points within a predetermined distance to the one or more determined data points).

In qd5 S8, the untrained machine learning model is then trained based on the remaining data points in the first time series data.

In addition, or alternatively, data points in the first time series data between a ramp down phase and a consecutive ramp up phase of the milling head are removed.

Acts S6, S7, and S8 may be performed in combination with acts S1 to S5 (e.g., between acts S2 and S3 and/or between acts S4 and S5), or may be performed independently (e.g., historical data may be treated as described in acts S6 to S8).

Figure 10:
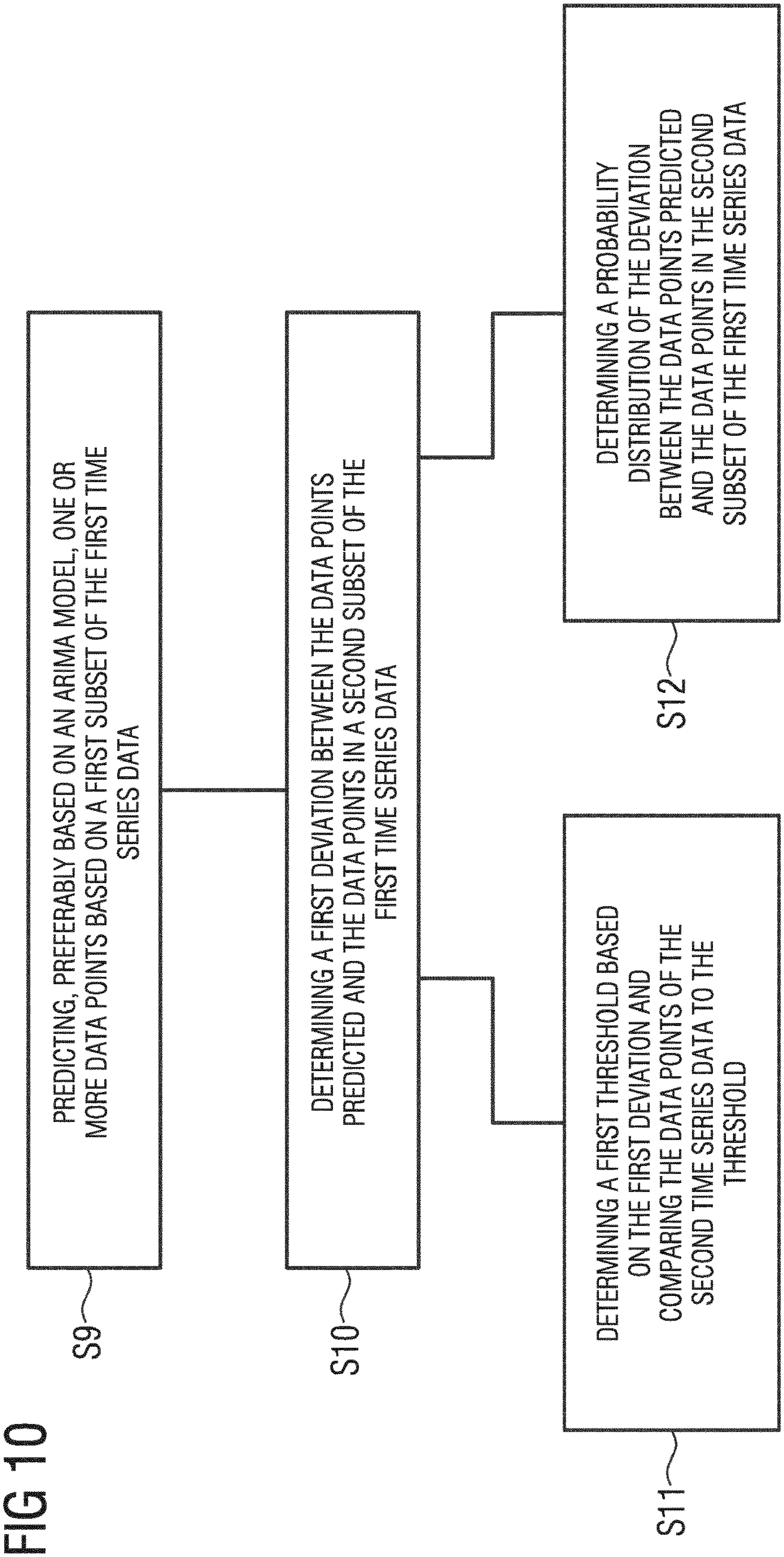
FIG. 10 shows an example of methods acts of another embodiment.

Turning to FIG. 10, further acts of an exemplary method are shown.

In act S9, based on an ARIMA model, for example, one or more data points are predicted based on a first subset of the first time series data. The prediction may be part of the training of the untrained machine learning model. One or more data points of the first time series data are used for predicting future data points in the time series.

In act S10, a first deviation between the data points predicted and the data points in a second subset of the first time series data is calculated. First time series data is divided into a first subset that serves as the basis of the prediction and a second subset that is used for comparison of the predicted values with actual values. The first subset serves for fitting the prediction model (e.g., ARIMA), the second subset determines which residuals are "normal," and during the predicting phase (e.g., including the second time series data), a simple "comparison" is done (e.g., how many inter quartile ranges is the new residual away from the median).

Now, in act S11, a first threshold is determined based on the first deviation. The first threshold may then be compared to the data points of the second time series data. Thus, an anomaly may be determined (e.g., during operation of the milling machine) based on that comparison, since the threshold serves as a measure for determining whether the second time series data is characteristic of nominal behavior. The previously untrained machine learning model is then trained.

Alternatively, in act S12, a probability distribution of the deviation between the data points predicted and the data points in the second subset of the first time series data may be determined. Thus, the distribution of the deviation from the forecast/predicted value is determined. The advantage is that it is possible to detect anomalies that do not only contain a deviating absolute value of the data, but rather, it is the deviation to the normal point of operation, which is individual to each milling machine, that is considered when determining an anomaly. The previously untrained machine learning model is then trained.

Acts S9 to S11 or S9 to S12 may be performed in combination with the method acts of FIG. 8 and/or FIG. 9 or may be performed independently.

Figure 11:
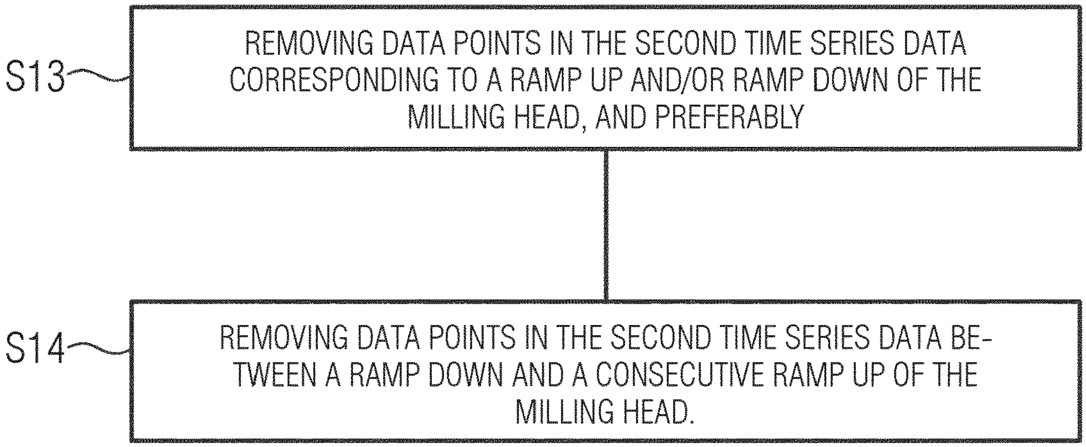
FIG. 11 shows an example of methods acts of another embodiment.

Turning to FIG. 11, in act S13, data points in the second time series data corresponding to a ramp up and/or ramp down of the milling head are removed. Additionally or alternatively, data points in the second time series data between a ramp down and a consecutive ramp up of the milling head are removed. Thereby, a data set (e.g., second time series data) comparable to the first time series data is obtained.

Figure 12:
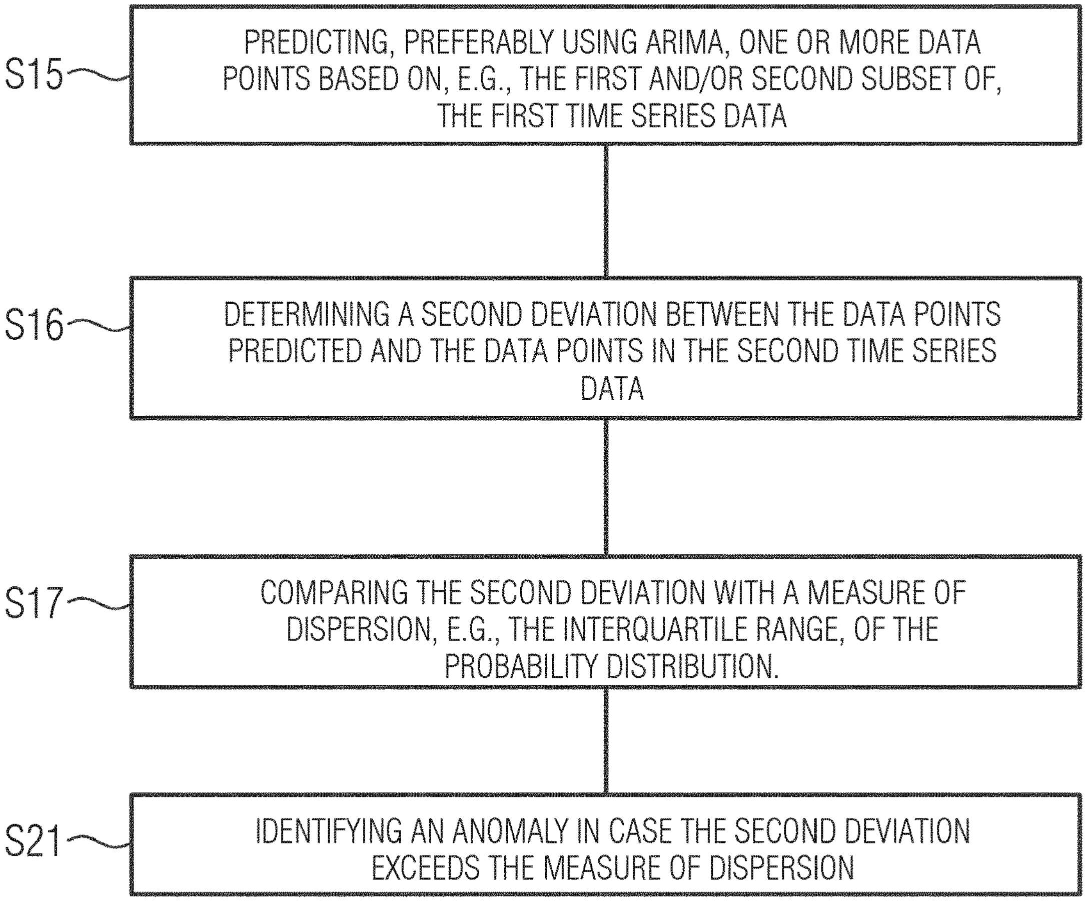
FIG. 12 shows an example of methods acts of another embodiment.

Turning to FIG. 12, in act S15 (e.g., using ARIMA), one or more data points may be predicted based on, for example, the first subset and/or the second subset of the first time series data.

The second time series data may include data indicative of the behavior later during the lifetime of the milling machine (e.g., the second time series data may be indicative of wear of the milling head or other non-normal behavior).

In act S16, a second deviation between the data points predicted and the data points in the second time series data may be determined.

In act S17, the second deviation is compared with a measure of dispersion (e.g., the interquartile range) of the probability distribution. As mentioned, the method and embodiments allow monitoring of milling machines, each of which has its own operation characteristics.

In a subsequent act S21, an anomaly is identified in case the second deviation exceeds the measure of dispersion. The identified anomaly may be output. Further, a counter may be increased in case an anomaly is detected. Based on the counter, a remaining useful life or outer maintenance measure may be initiated.

Figure 13:
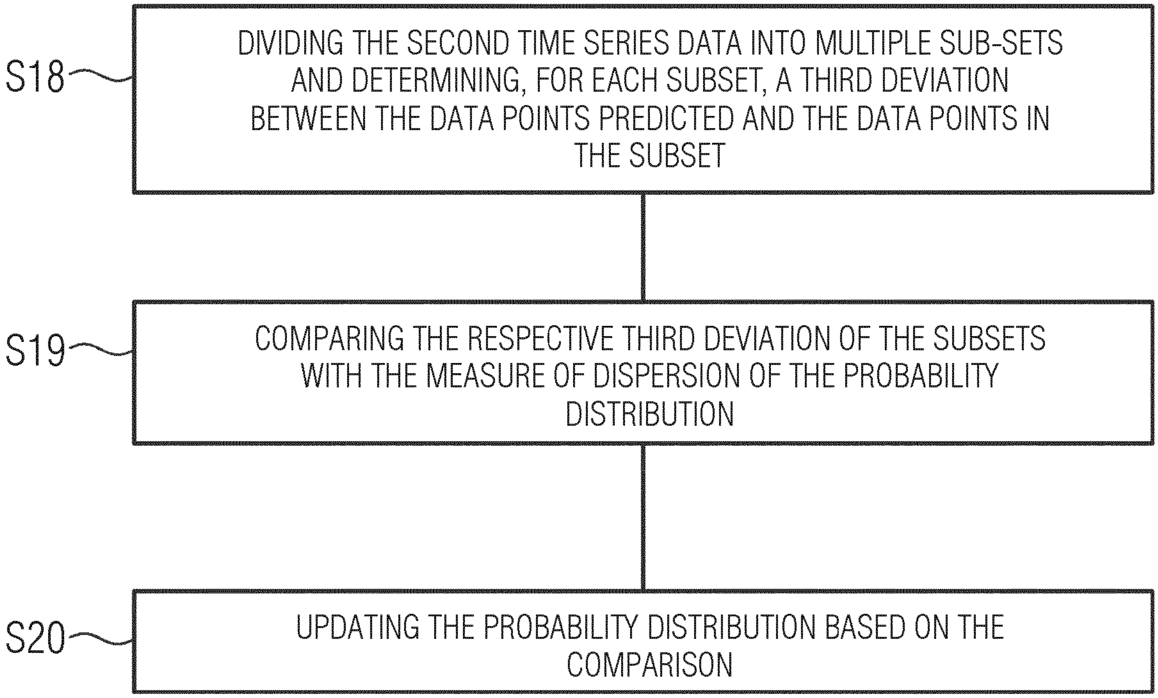
FIG. 13 shows an example of methods acts of another embodiment.

Turning to FIG. 13, in act S18, the second time series data is divided into multiple sub-sets, and, for each subset, a third deviation is determined between the data points predicted and the data points in the subset. In act S19, the respective third deviation of the subsets is compared with the measure of dispersion of the probability distribution. In act S20, the probability distribution is updated based on the comparison.

Figure 14:
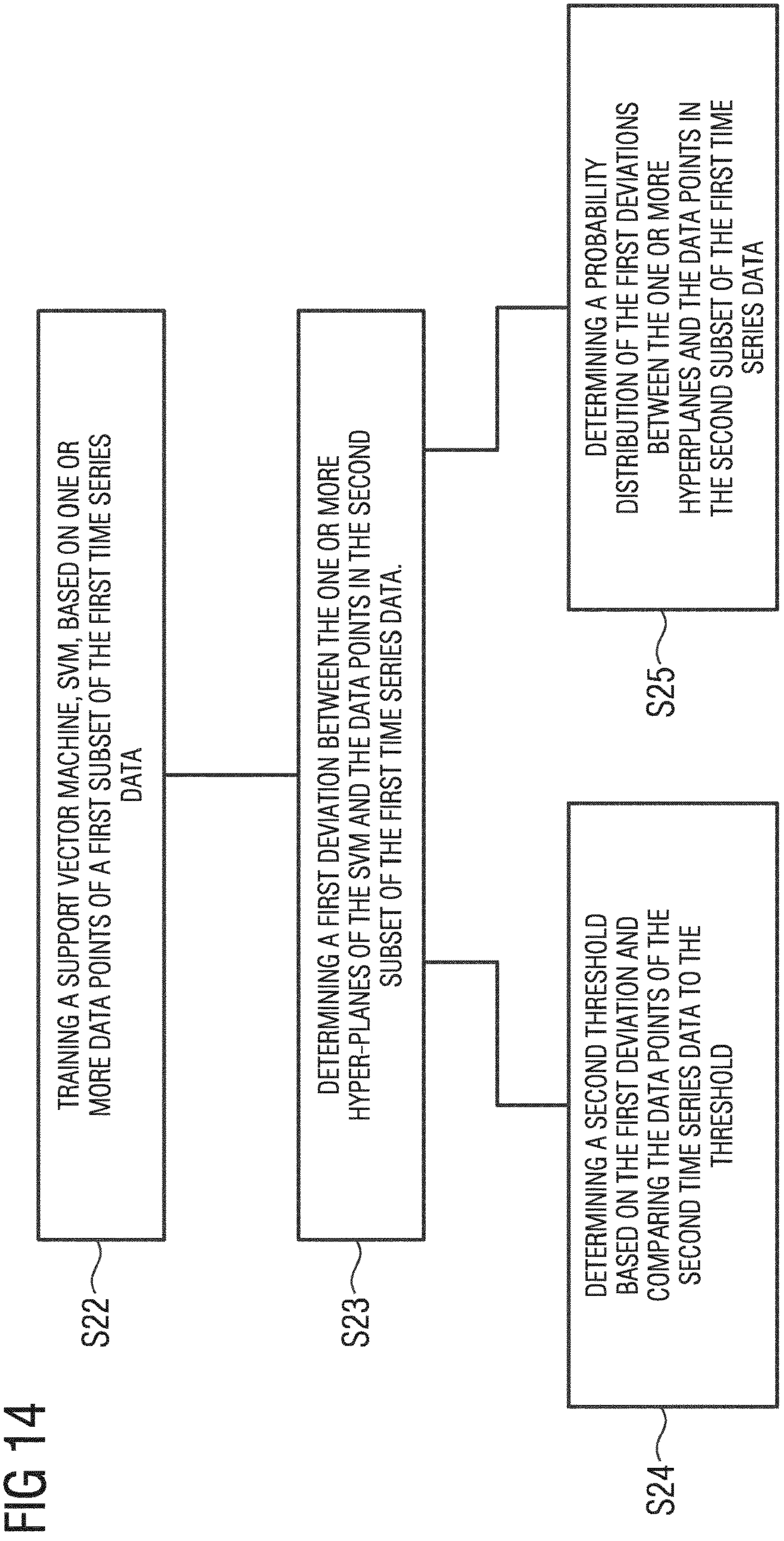
FIG. 14 shows an example of methods acts of another embodiment.

Turning to FIG. 14, in act S22, a Support Vector Machine (SVM) is trained based on one or more data points of a first subset of the first time series data. In act S23, a first deviation between the one or more hyper-planes of the SVM and the data points in the second subset of the first time series data is determined.

In act S24, a second threshold based on the first deviation is determined. The second threshold serves for comparing the data points of the second time series data to the second threshold.

Alternatively, in act S25, a probability distribution of the first deviations between the one or more hyperplanes and the data points in the second subset of the first time series data is determined. The machine previously untrained learning model is then trained.

Figure 15:
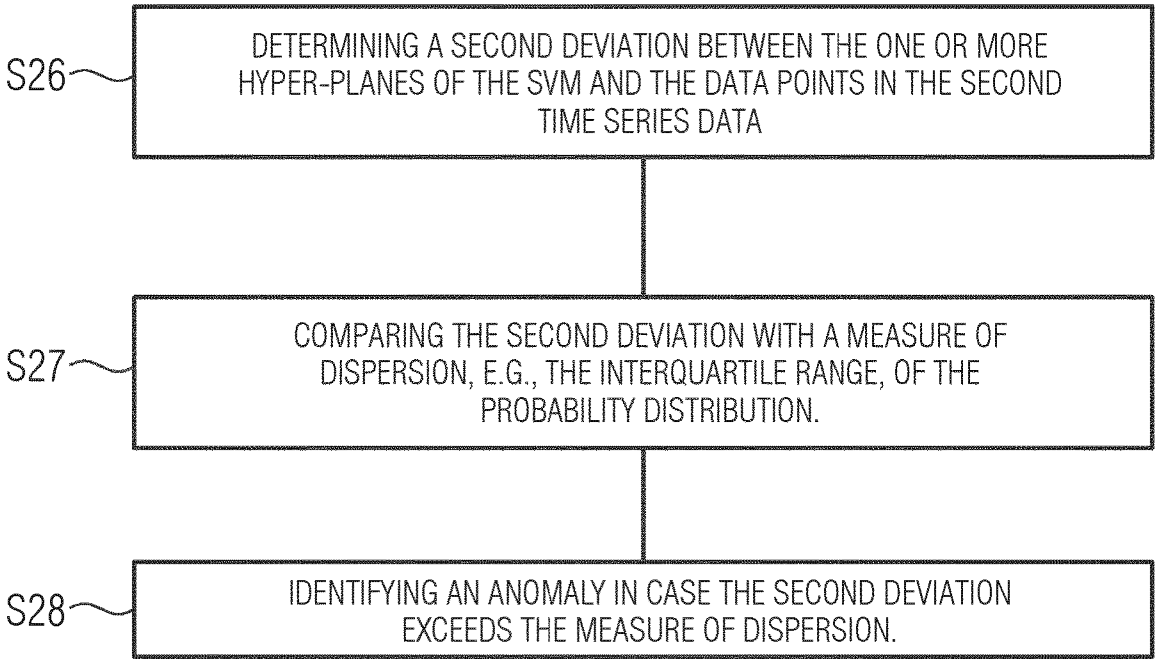
FIG. 15 shows an example of methods acts of another embodiment.

Turning to FIG. 15, in act S26, a second deviation between the one or more hyper-planes of the SVM and the data points in the second time series data is determined. In a subsequent act S27, the second deviation is compared with a measure of dispersion (e.g., the interquartile range) of the probability distribution. In act S28, an anomaly is identified in case the second deviation exceeds the measure of dispersion.

Figure 16:
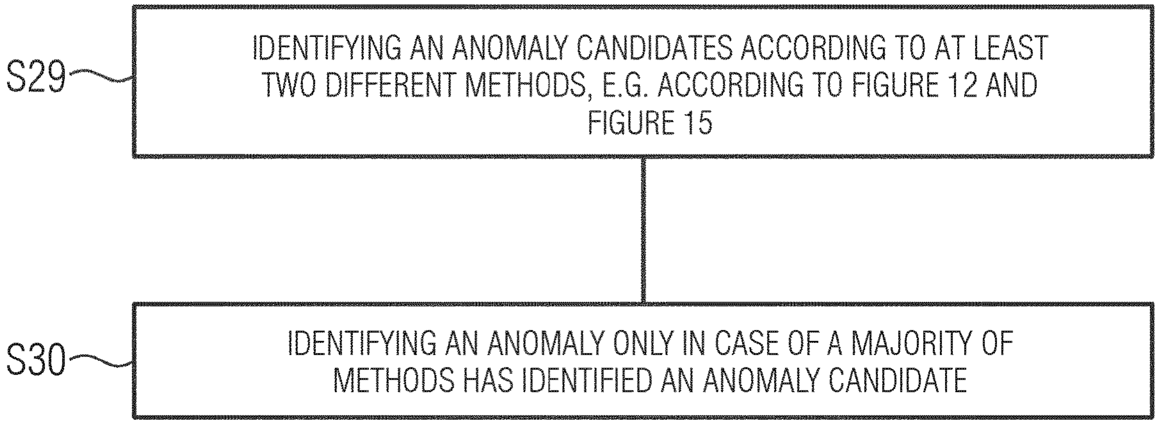
FIG. 16 shows an example of methods acts of another embodiment.

Turning to FIG. 16, in act S29, anomaly candidates (e.g., one or more data points) are determined according to at least two different methods (e.g., according to the embodiments of FIG. 12 and FIG. 15). An anomaly is then identified only if both methods yield the same result. In case more than the two methods are employed, the majority of the results may then decide whether the anomaly candidates are identified as anomalies.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of monitoring a milling machine, the method comprising:

deploying an untrained machine learning model for determining one or more anomalies in time series data;

obtaining, by the untrained machine learning model, during operation of the milling machine, first time series data representing a rotational speed of a milling head of the milling machine and at least one further operating parameter of the milling machine;

training the untrained machine learning model, during operation of the milling machine, based on the obtained first time series data;

obtaining, by the trained machine learning model, during operation of the milling machine, second time series data representing the rotational speed of the milling head of the milling machine and the further operating parameter; and determining, by the trained machine learning model, during operation of the milling machine, one or more anomalies in the second time series data, the determining of the one or more anomalies comprising determining a distribution over residuals and defining a domain for residuals of normal operation.

2. The method of claim 1, further comprising:

determining a ramp up phase, a ramp down phase, or the ramp up phase and the ramp down phase of the milling head, the ramp up phase, the ramp down phase, or the ramp up phase and the ramp down phase comprising one or more data points in the first time series data below a first threshold of the rotational speed of the milling head;

removing the determined data points of the ramp up phase, the ramp down phase, or the ramp up phase and the ramp down phase, as well as corresponding data points of the further operating parameter from the first time series data; and training the untrained machine learning model based on the remaining data points in the first time series data.

3. The method of claim 1, further comprising:

removing data points in the first time series data between a ramp down phase and a consecutive ramp up phase of the milling head.

4. The method of claim 1, wherein training the untrained machine learning model based on the first time series data comprises:

predicting based on a first subset of the first time series data one or more data points.

5. The method of claim 4, wherein training the untrained machine learning model based on the first time series data comprises:

determining a first deviation between the one or more data points predicted and the one or more data points in a second subset of the first time series data.

6. The method of claim 5, wherein training the untrained machine learning model based on the first time series data comprises:

determining a first threshold based on the first deviation, wherein the first threshold serves for comparing the data points of the second time series data to the first threshold.

7. The method of claim 5, wherein training the untrained machine learning model based on the first time series data comprises:

determining a probability distribution of the first deviation between the one or more data points predicted and the one or more data points in the second subset of the first time series data.

8. The method of claim 1, wherein determining, by the trained machine learning model, during operation of the milling machine, the one or more anomalies based on the second time-series data comprises:

removing data points in the second time series data corresponding to a ramp up, a ramp down, or the ramp up and the ramp down of the milling head;

removing data points in the second time series data between a ramp down and a consecutive ramp up of the milling head; or a combination thereof.

9. The method of claim 7, wherein determining, by the trained machine learning model, during operation of the milling machine, the one or more anomalies based on second time-series data comprises:

predicting one or more data points based on the first time series data; and determining a second deviation between the data points predicted and the data points in the second time series data.

10. The method of claim 9, wherein determining, by the trained machine learning model, during operation of the milling machine, the one or more anomalies based on second time series data comprises:

comparing the second deviation with a measure of dispersion of the probability distribution.

11. The method of claim 10, further comprising:

dividing the second time series data into multiple subsets and determining, for each subset of the multiple subsets, a third deviation between the data points predicted and the data points in the respective subset; and comparing the respective third deviation of the subsets with the measure of dispersion of the probability distribution; and updating the probability distribution based on the comparison.

12. The method of claim 10, wherein determining, by the trained machine learning model, during operation of the milling machine, the one or more anomalies based on the second time series data comprises:

identifying an anomaly in case the second deviation exceeds the measure of dispersion.

13. The method of claim 5, wherein training the untrained machine learning model based on the first time series data comprises:

training a support vector machine (SVM) based on one or more data points of the first subset of the first time series data; and determining a first deviation between one or more hyperplanes of the SVM and the data points in the second subset of the first time series data.

14. The method of claim 6, wherein training the untrained machine learning model based on the first time series data comprises:

determining a second threshold based on the first deviation and comparing the data points of the second time series data to the second threshold.

15. The method of claim 13, wherein training the untrained machine learning model based on the first time series data comprises:

determining a probability distribution of the first deviations between the one or more hyperplanes and the data points in the second subset of the first time series data.

16. The method of claim 13, wherein determining, by the trained machine learning model, during operation of the milling machine, the one or more anomalies based on the second time series data comprises:

determining a second deviation between the one or more hyperplanes of the SVM and the data points in the second time series data.

17. The method of claim 16, wherein determining, by the trained machine learning model, during operation of the milling machine, the one or more anomalies based on the second time series data comprises:

comparing the second deviation with a measure of dispersion of the probability distribution.

18. The method of claim 10, further comprising:

dividing the second time series data into multiple sub-sets and determining, for each of the multiple subsets, a third deviation between the data points predicted and the data points in the subsets;

comparing the respective third deviation of the subsets with the measure of dispersion of the probability distribution, and updating the probability distribution based on the comparison.

19. The method of claim 10, wherein determining, by the trained machine learning model, during operation of the milling machine, the one or more anomalies based on the second time series data comprises:

identifying an anomaly in case the second deviation exceeds the measure of dispersion.

20. An apparatus comprising:

a processor; and memory, wherein the processor is configured to monitor a milling machine, the processor being configured to monitor the milling machine comprising the processor being configured to:

deploy an untrained machine learning model for determination of one or more anomalies in time series data;

obtain, by the untrained machine learning model, during operation of the milling machine, first time series data representing a rotational speed of a milling head of the milling machine and at least one further operating parameter of the milling machine;

train the untrained machine learning model, during operation of the milling machine, based on the obtained first time series data;

obtain, by the trained machine learning model, during operation of the milling machine, second time series data representing the rotational speed of the milling head of the milling machine and the further operating parameter; and determine, by the trained machine learning model, during operation of the milling machine, one or more anomalies in the second time series data, the determining of the one or more anomalies comprising determining a distribution over residuals and defining a domain for residuals of normal operation.

* * * * *